March 2, 1937.   P. C. KEITH, JR   2,072,456
PROCESS FOR THE STABILIZATION OF HYDROCARBON DISTILLATE
Filed Dec. 1, 1934
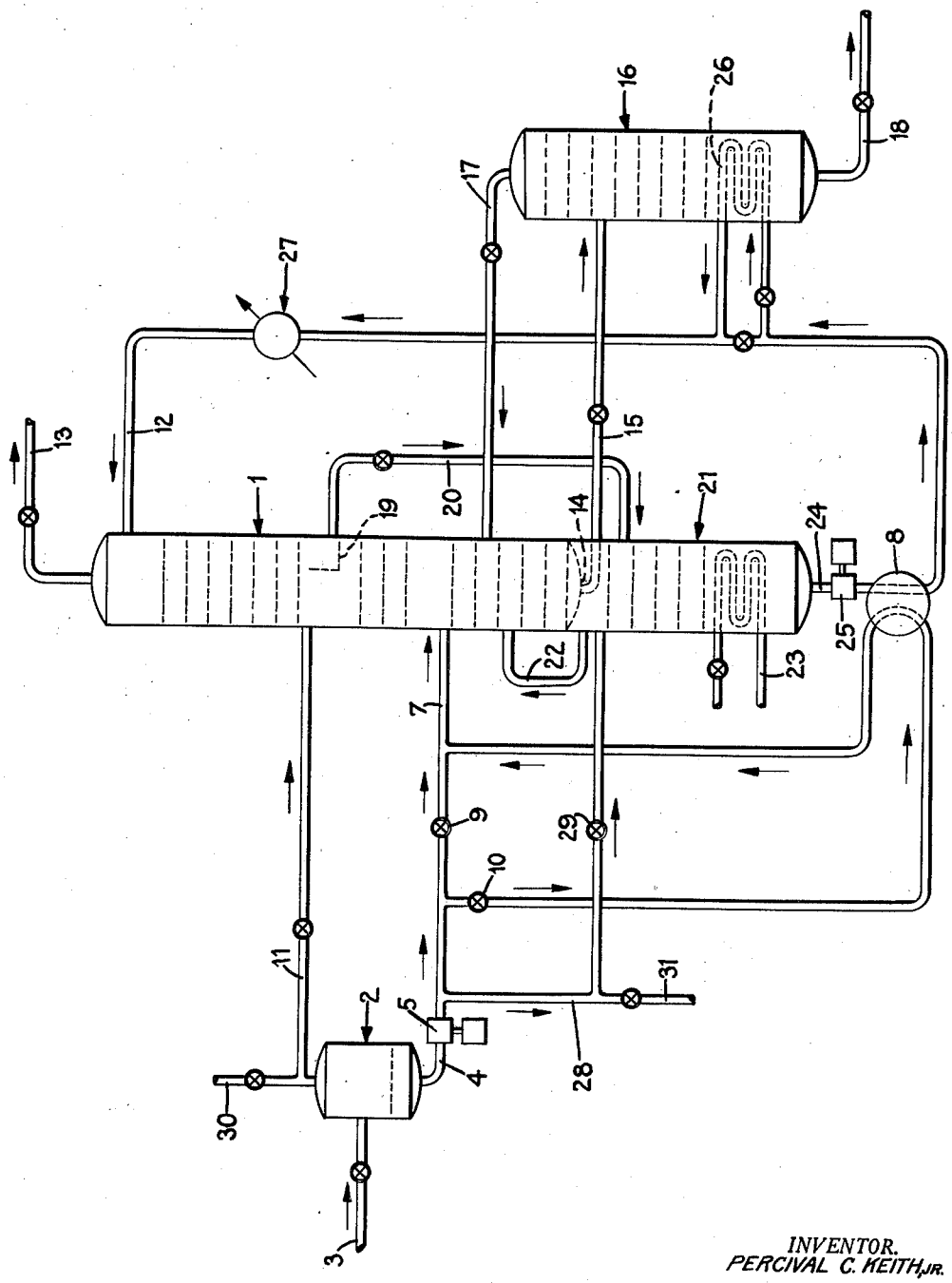
INVENTOR.
PERCIVAL C. KEITH, JR.
BY
ATTORNEY Patented Mar. 2, 1937

2,072,456

UNITED STATES PATENT OFFICE 2,072,456

PROCESS FOR THE STABILIZATION OF HYDROCARBON DISTILLATE

Percival C. Keith, Jr., Peapack, N. J., assignor to Gasoline Products Company, Inc., Newark, N. J., a corporation of Delaware Application December 1, 1934, Serial No. 755,532

3 Claims. (Cl. 196—11)

This invention relates to improvements in combined stabilization and absorption processes, and refers more particularly to a process and apparatus of extremely simple nature for accomplishing simultaneously the absorption and recovery of valuable gasoline from gas containing such gasoline in vapor form, and the stabilization of the gasoline or other oil; to provide a process in which there is rejected from the oil undesirable light components which, if retained, would give an inferior product, which product would suffer undue evaporation loss on subsequent handling and storage.

The single figure is a diagrammatic side elevational view of apparatus adapted to carry out the process.

In connection with the explanation of the method, it will be understood that, under different conditions, the process may be modified considerably as to temperatures, pressures and methods of applying heating and cooling effects without departing from the spirit and scope of the invention.

Referring to the drawing: a bubble tower 1 is shown, consisting of a vertical, cylindrical column containing a number of bubble plates of any suitable design, such as is now commonly used in the petroleum art. A usual type of distillate separator or receiving drum, such as is connected to a cracking unit of a conventional design, is shown at 2, into which flows, through the line 3, with or without an accompanying reduction of pressure, a mixture of pressure distillate and gas produced by the cracking operation. The temperature of this mixture may be about 100° F. and the pressure on the separator may vary from as low as 15 pounds gauge pressure to as high as 250 pounds or more, gauge pressure, depending on the type of cracking operation which is being employed.

The liquid distillate in the drum 2 is withdrawn through line 4 by means of pump 5, and is discharged through line 7 to one or more points in an intermediate portion of the tower 1, or this distillate discharged to the tower may be first circulated wholly or in part through a heat exchanger 8, hereinafter further explained, by closing the valve 9 and opening valve 10. The gases and vapors entering the drum with the distillate separate from the distillate and flow continuously from the drum 2 and, wholly or in part, to the tower 1 through line 11, entering the tower at one or more points, preferably above the point of entrance of the distillate through the line 7. Part or all of the gases and vapors may be withdrawn from the process through line 30, or additional gases and vapors from an external source may be supplied through the same connection.

In the tower 1 the introduced distillate separates into vapors and liquids, the former passing upwardly through the tower while the latter gravitate downwardly against a rising stream of hot vapors from a source which will be explained hereinafter. The introduced gases pass upwardly through the tower against a downwardly flowing stream of absorber oil, introduced through pipe 12 near the top of the tower, and are thereby scrubbed free of their heavier constituents suitable for inclusion in the final desired gasoline distillate. Some lighter constituents may also be removed from the rising gas and vapors by the downwardly flowing liquid absorber oil but these undesirably light constituents are subsequently removed from the downwardly flowing liquid during a later portion of the operation. The dry residue gases, which are so light as to be undesirable for inclusion in the stabilized distillate, pass from the top of the tower through vapor line 13 for use as fuel or for any other desired purpose.

The liquid portions of the distillate introduced through line 7 undergo partial stabilization in passing downwardly through the tower, this stabilization being effected by counter-flow contact of rising vapors with the downwardly moving liquid, effective contact of the two being brought about by the medium of bubble plates or other well known contacting means with which the tower is equipped. The distillate is drawn off from the tower at point 14, through line 15, the tower being provided with a partition at this point. The distillate so withdrawn is then preferably subjected to additional stabilization in a secondary stabilizing tower or stripper 16, which is also supplied with bubble trays or other suitable contacting means which serve to cause thorough contact between rising vapors and downwardly flowing liquids. The resulting vapors pass off through conduit 17 and are preferably returned to the stabilizer column 1 for further treatment, while the desired stabilized gasoline is removed from the process through pipe 18. The liquid oil introduced into the tower 16 may serve itself as a refluxing medium but, if desired, additional cooling may be supplied to the top of the auxiliary stabilizer column 16 in any well known manner.

Part of the downwardly flowing liquid absorber oil, enriched by the inclusion of the absorbed constituents derived from the rising gases, collects on a partial trap-out tray 19 located in an intermediate portion of the tower 1, is withdrawn therefrom through conduit 20 and injected into the lowest portion of the tower 1, indicated by reference numeral 21, this constituting a stripper wherein the introduced liquid is partially vaporzed with the result that the lighter, absorbed constituents are freed as vapors. These vaporized constituents pass off from the section 21 through vapor pipe 22, back to the column 1 at an intermediate point above the partition 14, and are therein subjected to additional stabilization and absorption. The stripping of the lighter constituents from the liquid introduced into section 21 is aided by the application of heat to the base of the stripper section, this being effected, for example, by the aid of a reboiler coil 23, through which a highly heated fluid may be passed, from a source not shown. Or, if desired, steam or hot gases may be introduced directly into the base of the stripper in order to supply heat by direct contact.

The liquid oil is withdrawn from the base of the stripper through conduit 24 and is forced by pump 25 through one side of the direct heat exchanger 8, and then through the line 12 into the top of the column 1 as explained hereinbefore, after having optionally passed through the indirect heat exchange coil 26 in the base of the auxiliary stabilizer column 16 to aid in carrying out the stripping or stabilization process therein. Reference numeral 27 indicates an auxiliary cooler for additionally reducing the temperature of the absorber oil introduced into the top of the tower 1.

An adequate supply of absorber oil at all times is insured by the provision of conduit 28 through which any desired amount of the fresh distillate from receiver 2 may be forced directly into the stripper 21 to be stripped of its lighter constituents, just as already described in connection with the absorber oil introduced into the stripper through line 20. A valve 29 serves to regulate the amount of distillate so introduced into the stripper. Or additional distillate from an external source may be introduced through line 31, or this line may be used to remove part of the distillate from receiver 2, from the process.

Briefly describing the functioning of the method, the distillate in the receiver 2 contains, in addition to its gasoline content, an appreciable amount of material undesirable for gasoline, such material being too volatile to be a satisfactory component of the gasoline. Such materials are methane, ethane, propane, or corresponding hydrocarbons of other than the paraffin series.

The gas leaving the reservoir 2 through the line 11 contains appreciable quantities of material which should properly be included in a gasoline, such as butane, pentane and heavier constituents, and their isomers and hydrocarbons of other than the paraffin series having substantially corresponding boiling points. It is desirable in this operation to transfer from the distillate to the gas the undesirable constituents, and to transfer from the gas to the distillate the desirable material; in other words, to free the distillate of propane and lighter material and to recover as liquid from the gas as much as possible of the butane and heavier products.

To accomplish this effect, the distillate is heated and the light material is driven off by fractional distillation. This fractional distillation is partially done by preheating the distillate in the heat exchanger 8, and is further accomplished by heat derived from its descent through the tower 1 to the outlet 15, as it passes countercurrent to the ascending flow of vapor of relatively high temperature. If desired the distillate may be additionally heated prior to its introduction into the tower 1 in any well known manner. Likewise, heat may be supplied to the liquid collecting above the partition at 14, by indirect heat exchange or by the direct introduction of steam or hot gases. The final elimination of undesirable products is preferably secured in the stripping column 16. The temperature held at the bottom of the tower 16 is then a vital control factor and is dependent on the pressure used and on the quality of product desired, which quality is, in turn dependent on various factors in the refinery as a whole, including the character of the oil being treated, the nature of the cracking operation and the treatment the oil has received prior to its being introduced to the present system.

The oil flowing downwardly through the upper portion of the tower 1 is divided into two parts, one of which continues downwardly through the remainder of the tower to the partition 14, being withdrawn subsequently through pipe 15 to the auxiliary stabilizer or stripper 16, while the other portion is collected on trap-out tray 19 and passed through the conduit 20 into stripper 21, wherein it is converted into absorber oil by being freed of its lighter constituents. The amount of oil flowing through the pipe 20 is dependent upon the amount of absorber oil necessary, which is in turn dependent upon the pressure used in the operation, and other factors. The oil passing downwardly through the stripper section 21 is progressively heated until it reaches a final temperature of, for example, 400° F., when the tower is operating under a pressure of about 35 pounds per square inch, which temperature reduces the oil to such an extent that it is a satisfactory absorber oil. This oil is withdrawn from the bottom of the column through pipe 24, cooled and used as absorber oil in the top of the column 1, where it extracts, by selective absorption, the desirable components of the gases and vapors fed to the column through the line 11, as well as those in the ascending vapors from the lower part of the column, thus serving as an absorption oil for the gas and as a refluxing medium for the column. The upper portion of the column above the partition 14 therefore serves as an absorbing and fractionating section, while the lower portion of the column acts as a stripping section. Some undesirable products are also absorbed but are subsequently removed in the lower portion of the tower.

The amount of absorber oil is based on the amount of residue gases leaving the system and, dependent on the pressure and other conditions, may be equal to from 60 to 100 gallons for each thousand feet of residue gas, as measured at atmospheric pressure. The amount of heat supplied to the system at the bottom of the tower and in the feed heat exchanger 8 is a function of the amount of absorber oil required.

The various valves shown on the drawing and not indicated specifically by reference numerals are for obvious control purposes. The pressure on the distillate introduced into the reservoir 2 from the line 3 may be reduced so as to aid in the separation of the gases and light vapors from liquids. Similarly a reduction in pressure may be made in the distillate withdrawn from the tower 1 through line 15 for passage to the auxiliary stripper 16, although in this event the passage of the vapors through the line 17 to the tower 1 would have to be aided by a compressor, or these vapors would have to be vented elsewhere. If desired, as already mentioned, an indirect heat exchanger might be placed in the tower 1 above the partition 14 to aid in the stripping of the lighter constituents from the distillate to be withdrawn. Generally, however, sufficient heat is supplied by the vapors entering through the vapor line 22, this heat having been originally derived from the direct heat exchanger 23.

While it has been suggested that the distillate charged to the system is recovered from an oil cracking system, the process may be used in connection with the absorption and stabilization of any type of distillate and gas, whether they are equilibrium products or not. Gas and distillate may be derived from separate sources and introduced to the system, as well as distillates taken from cracking operations, as suggested. In other words, the oil may be light gasoline or gas from any source or various sources in the refinery or oil field, such as gas and oil recovered from natural sources.

From this description it will be seen that the entire process is self-contained and highly efficient in that an entirely adequate supply of absorber oil is always obtainable. The absorber oil is cyclically circulated through the process. This absorber oil is derived from the distillate to be treated and therefore portions thereof are always being diverted from the process as part of the stabilized gasoline distillate product, while other portions circulate through the absorber column to pick up more of the desirable constituents from the light vapors and gases. This process is particularly well adapted for use in connection with the low pressure treatment of distillates and gases to produce a stabilized product, since such a large supply of absorber oil is available. It is, however, well adapted for use in connection with high pressure absorption processes as well.

If desired, only the liquid component, or only the gaseous component of the initial charging stock may be introduced into the stabilization and absorption zone for treatment, or only a portion of both constituents may be introduced into the system. The initial distillate to be treated may be derived from a cracking process, in which event it would be the condensate derived by condensing the vapors from the fractionating equipment, or it may be a condensate of this general nature which has been partially freed of lighter products, as for example, by a reduction in the pressure thereof. Or, the distillate to be treated may be obtained from other sources. It may be, for example, a so-called "wild virgin gasoline" or naphtha.

While I have described a particular embodiment of my invention for the purposes of illustration, it should be understood that various modifications and adaptations thereof, occurring to one skilled in the art, may be made within the spirit of the invention as set forth in the appended claims.

I claim:

1. The process of stabilizing hydrocarbon oil distillate to produce a stable product of desired vapor pressure which comprises passing a portion of said oil distillate into a stripping zone, maintaining said stripping zone under temperature and pressure conditions which will vaporize low-boiling constituents therefrom, passing vapors so formed into an intermediate section of an absorbing and stabilizing tower, withdrawing unvaporized residue from said stripping zone, cooling the residue so withdrawn, passing said cooled residue into the top of said tower above the point of entry of vapors from said stripping zone, passing said cooled residue downwardly through said tower in countercurrent contact with upwardly rising vapors whereby said cooled residue serves as absorber oil for constituents of said vapors desired in the final stabilized product, introducing additional oil distillate to be stabilized into an intermediate point in said stabilizing and absorbing tower, passing said additional distillate downwardly through said tower against the upwardly flowing stream of gases and vapors, withdrawing the stabilized product from the lower portion of said tower, withdrawing a portion of enriched absorber oil from an intermediate point in said absorbing tower above the point of entry of said additional oil distillate, passing said portion to said stripping zone and commingling the same with oil distillate being stripped therein whereby said enriched absorber oil is stripped of lower-boiling constituents absorbed therein, and withdrawing residual gas from the top of said tower.

2. The process of stabilizing hydrocarbon oil distillate to produce a stable product of desired vapor pressure and to recover desired liquid hydrocarbons from normally gaseous hydrocarbons which comprises passing a portion of said oil distillate into a stripping zone, maintaining said stripping zone under temperature and pressure conditions which will vaporize low-boiling constituents therefrom, passing vapors so formed into an intermediate section of an absorbing and stabilizing tower, withdrawing unvaporized residue from said stripping zone, cooling the residue so withdrawn, passing said cooled residue into the top of said tower above the point of entry of vapors from said stripping zone, introducing hydrocarbon gases containing constituents desired in said stabilized product into an intermediate point of said tower, passing said cooled residue downwardly through said tower in countercurrent contact with upwardly rising vapors whereby said cooled residue serves as absorber oil for constituents of said vapors desired in the final stabilized product, introducing additional oil distillate to be stabilized into an intermediate point in said stabilizing and absorbing tower below the point of entry of said hydrocarbon gases, passing said additional distillate downwardly through said tower against the upwardly flowing stream of gases and vapors, withdrawing the stabilized product from the lower portion of said tower, withdrawing a portion of enriched absorber oil from an intermediate point in said absorbing tower above the point of entry of said additional oil distillate, passing said portion to said stripping zone and commingling the same with oil distillate being stripped therein whereby said enriched absorber oil is stripped of lower-boiling constituents absorbed therein, and withdrawing residual gas from the top of said tower.

3. The method of stabilizing hydrocarbon oil distillate to produce a stable product of desired vapor pressure, which comprises passing oil distillate into a stripping zone, maintaining said stripping zone under temperature and pressure conditions which will vaporize lower-boiling constituents including undesired constituents and constituents desired in said final stabilized product, passing said vaporized constituents into an intermediate section of an absorbing and stabilizing tower, withdrawing residue from said stripping zone, cooling the withdrawn residue, passing said cooled residue into the top portion of said tower above the point of entry of the vapors from said stripping zone, passing said cooled residue downwardly through said tower in countercurrent contact with the upwardly rising vapors from said stripping zone whereby said cooled residue serves to absorb constituents of said vapors desired in said final stabilized product and said cooled distillate is subjected to fractional distillation to liberate undesired lower-boiling constituents therefrom, introducing additional oil distillate into said tower at an intermediate point, withdrawing unvaporized distillate from the bottom portion of said absorbing and stabilizing tower as the desired distillate product, and withdrawing residual gas from the top of said tower.

PERCIVAL C. KEITH, Jr.